US008639572B1

(12) United States Patent
Barnes et al.

(10) Patent No.: US 8,639,572 B1
(45) Date of Patent: Jan. 28, 2014

(54) INTELLIGENT ADVERTISEMENT SELECTION FROM MULTIPLE SOURCES

(75) Inventors: James D. Barnes, Overland Park, KS (US); Mandar Bhanushali, Olathe, KS (US); Peter H. Distler, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 904 days.

(21) Appl. No.: 12/031,432

(22) Filed: Feb. 14, 2008

(51) Int. Cl.
*G06Q 30/00* (2012.01)

(52) U.S. Cl.
USPC .................... 705/14.4; 705/14.49; 705/14.46; 705/14.55; 705/14.66; 705/14.67

(58) Field of Classification Search
USPC ........................................... 705/1–45
See application file for complete search history.

(56) References Cited

U.S. PATENT DOCUMENTS

| 6,385,592 | B1 * | 5/2002 | Angles et al. | 705/14.56 |
|---|---|---|---|---|
| 7,961,861 | B2 * | 6/2011 | Kliger | 379/201.01 |
| 8,385,514 | B2 * | 2/2013 | Batni et al. | 379/76 |
| 2002/0099600 | A1 * | 7/2002 | Merriman et al. | 705/14 |
| 2007/0156520 | A1 * | 7/2007 | Sharma | 705/14 |
| 2008/0313039 | A1 * | 12/2008 | Altberg et al. | 705/14 |

* cited by examiner

*Primary Examiner* — Rajesh Khattar

(57) ABSTRACT

Computer implemented methods and systems are provided for intelligent advertisement selection from multiple sources. A request for a content page is received from a device. An advertisement source is selected from a plurality of advertisement sources based on an advertisement source request from a content provider. The content page is generated based on the selection of the advertisement source. An advertisement is selected from a plurality of advertisements based on an advertisement from the content page. The content page is provided to the device. The advertisement is provided to the device.

14 Claims, 8 Drawing Sheets

INTELLIGENT ADVERTISEMENT SELECTION FROM MULTIPLE SOURCES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Devices include applications, such as web browsers, that can request content from content providers, such as website servers. Content providers may format the requested content specifically for mobile device display screens. Content providers may have an arrangement with a specific advertisement source to supplement requested content with advertisements. However, the advertisement source may not sell all of the advertising spots available within the content provided by the content provider.

SUMMARY

The present disclosure provides computer implemented methods and systems for selecting from multiple advertisement sources. In some embodiments, a request for a content page is received from a device. An advertisement source is selected from a plurality of advertisement sources based on an advertisement source request from a content provider. The content page is generated that references the selection of the advertisement source. An advertisement is selected from a plurality of advertisements based on an advertisement request from the content page. The content page is provided to the device. The advertisement is provided to the device.

In some system embodiments, the system includes a first processor, a second processor, an advertisement source selection component, and an advertisement selection component. The advertisement source selection component is executed by the first processor to select an advertisement source from a plurality of advertisement sources based on an advertisement source request associated with a content page. The advertisement selection component is executed by the second processor to select an advertisement from a plurality of advertisements based on an advertisement request associated with the content page. The advertisement source provides the advertisement to the device.

In some other embodiments, a request is received for a content page from a device. A content provider server provides the content page and a code associated with the content page. An advertisement is obtained from a plurality of advertisement sources based on a communication service provider server using the code. The content page is generated and the advertisement are provided to the device.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
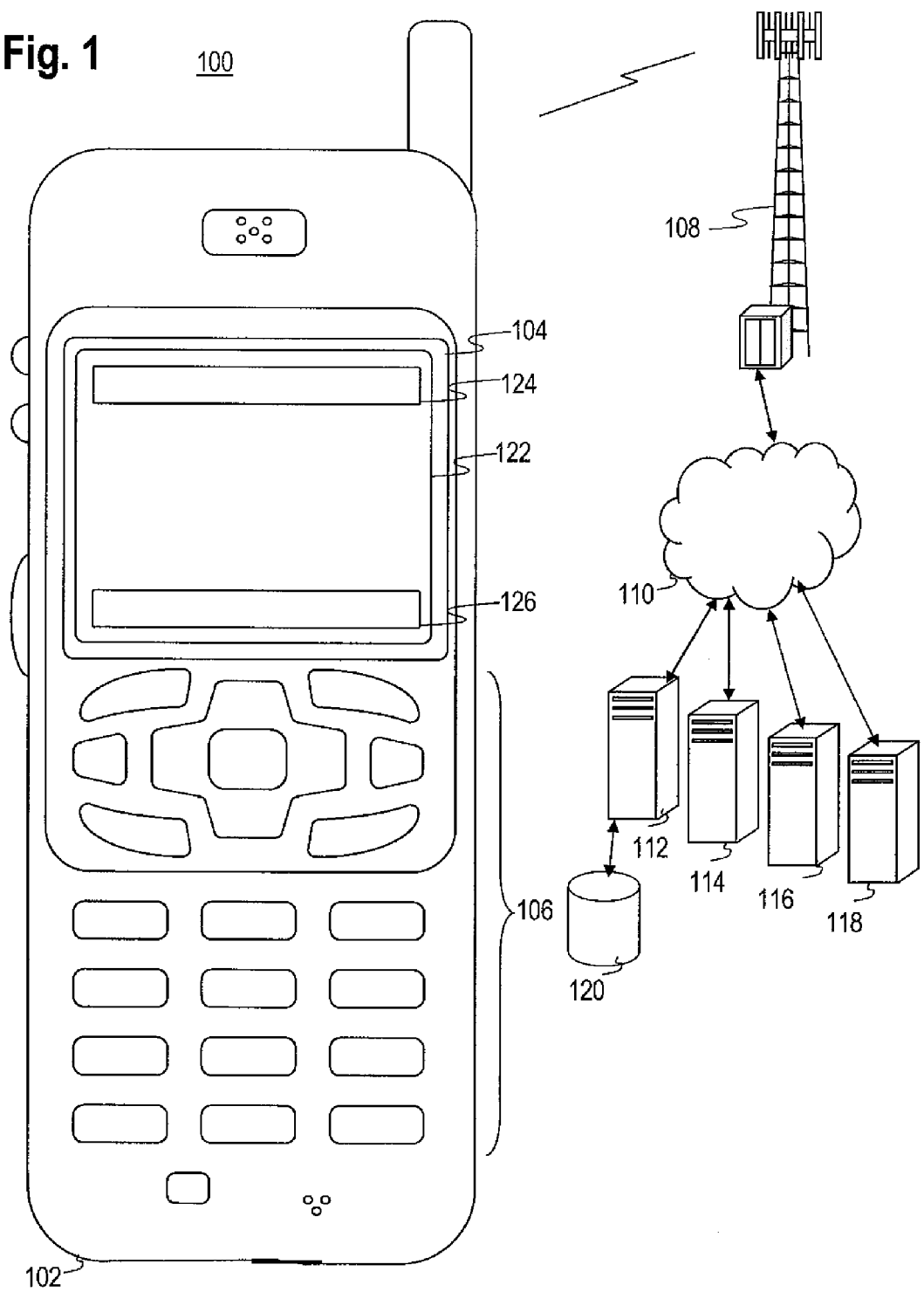
FIG. 1 is an illustration of a wireless communications system for intelligent advertisement selection from multiple sources according to some embodiments of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

When a computer user selects a web page for viewing, the web page content provider may request an advertisement from an advertisement source to dynamically stitch or otherwise insert into a display position at the top of the content page or on the side of the content page before sending the content page to be displayed by the browser of the computer user. The advertisement source, for example a vendor of advertisements, may pay the content provider for stitching the advertisements into the content page. Other methods of stitching the advertisement into the content page, such as by the browser on the computer of the user, are also known. The advertisement source may sell advertising spots within the content to advertisers; the content may be provided by the content provider, such as a website server. When devices request content from the content provider, the advertisement source may select between different advertisements to provide as supplements to the requested content. For example, if a mobile phone user activates a web browser to request news content from a news website server, the website server may have a limited amount of time to request an advertisement from the advertisement source. If the content provider determines that the advertisement source has not sold the advertising spot, the content provider may select and receive a replacement advertisement from a different advertisement source, and convey this replacement advertisement to the mobile phone. However, the additional time required for the selection of the different advertisement source and the subsequent processing may produce a dissatisfying delay for the device user.

In some embodiments, a content page is generated and a communication service provider executes application program interfaces to select an advertisement source from among multiple advertisement sources and then to select an advertisement from the selected advertisement source in response to a device request for a content page. In this situation, the communication service provider may be responsible for ad selection. Because the responsibility for selecting the advertisement source and the advertisement may be a valuable and powerful right, the communication service provider and the content provider may agree to share this responsibility. A variety of ways to share this responsibility are possible, all of which are contemplated by this disclosure. A contract or other agreement may allocate responsibility for selecting the advertisement source and the advertisement of a first percentage of all content requests to the communication service provider and of a second percentage of all content requests to the content provider. For example, according to an agreement, the responsibility for selecting the advertisement sources and the advertisements to insert into the content returned in response to 20% of content requests may be allocated to the communication service provider; the responsibility for selecting the advertisement sources and the advertisements to insert into the content returned in response to 80% of content requests may be allocated to the content provider. The agreement may further take consideration of location of advertisement placement in the content returned to a requesting user, for example placement at the top, bottom, left, or right side of a page of content; and for example, placement on a first page of content versus a second and/or later page of content. The agreement may further take into consideration the value of the content requested, for example the current popularity of the requested content. By distributing the selections between multiple advertisement sources, the possibility may be reduced of selecting an advertisement source that has not sold all of the advertising spots.

Additionally, the communication service provider may select an advertisement source or target an advertisement for the requesting device based on a device user profile. For example, if a device user profile indicates frequent music downloads by a device that is requesting a content page, the communication service provider may select a music download advertisement for the requested content page.

In some embodiments, an advertisement source is selected in response to a device request for a content page before the requested content page is generated. The advertisement source may be selected based on a pre-arranged distribution of selections between multiple advertisement sources. For example, the content provider's advertisement source may be selected for advertising spots at the top of content pages and the communication service provider's advertisement source may be selected for advertising spots at the bottom of content pages. In another example, the content provider's advertisement source may be selected for advertising spots at the front content pages and the communication service provider's advertisement source may be selected for advertising spots at the back content pages. In yet another example, selections between multiple advertising sources may be distributed based on pre-determined distribution percentages, such as the percentages of advertising spots that an advertisement source previously sold. The selection of the advertisement source may be reported to a revenue share tracker, which may be used as the basis for distributing subsequent selections between the multiple advertisement sources. Code in the generated content page may select an advertisement from the selected advertisement source based on the content page requested. For example, when a sports-news content page is requested, the selected advertisement may be a sports-oriented advertisement. The generated content page may be provided with the selected advertisement to the requesting device without any noticeable delay for the selection between the multiple advertisement servers.

In some embodiments, a content page is generated that has code to select both an advertisement source and an advertisement from the advertisement source in response to a device request for a content page. In some embodiments, an advertisement source is selected and an advertisement is selected from the advertisement source in response to a device request for a content page before the requested content page is generated based on the selections.

FIG. 1 shows a wireless communications system 100 including the device 102. FIG. 1 depicts the device 102, which is operable for implementing aspects of the present disclosure. Though illustrated as a mobile phone, the device 102 may take various forms including a personal computer, a mobile computer, a portable computer, a tablet computer, a laptop computer, and a desktop computer. The device 102 may take various forms with a screen size reduced to a maximum of 4 inches by 6 inches, including a mobile telecommunication device, a mobile handset, a personal digital assistant (PDA), a handheld gaming device, a handheld wireless mobile device, a pager, a digital camera, a digital music player, and a digital calculator. An advertisement source may have a limited number of advertisements that are specifically formatted for a device with a reduced screen size. Many suitable devices combine some or all of these functions. In some embodiments of the present disclosure, the device 102 is not a general purpose computing device like a portable, laptop or tablet computer, but rather is a special-purpose communications device such as a mobile phone, wireless handset, pager, or PDA. The device 102 may support specialized activities such as gaming, inventory control, job control, and/or task management functions, and so on.

The device 102 includes a display 104 and a touch-sensitive surface or keys 106 for input by a user. The device 102 may present options for the user to select, controls for the user to actuate, and/or cursors or other indicators for the user to direct. The device 102 may further accept data entry from the user, including numbers to dial or various parameter values for configuring the operation of the device 102. The device 102 may further execute one or more software or firmware applications in response to user commands. These applications may configure the device 102 to perform various customized functions in response to user interaction. Additionally, the device 102 may be programmed and/or configured over-the-air, for example from a wireless base station, a wireless access point, or a peer device 102.

The device 102 may execute a web browser application which enables the display 104 to show a web page. The web page may be obtained via wireless communications with a base transceiver station 108, a wireless network access node, a peer device 102 or any other wireless communication network or system. The base transceiver station 108 (or wireless network access node) is coupled to a network 110, such as the Internet. Via the wireless link and the network 110, the device 102 may have access to information on various servers, such as a communication server 112, a content provider server 114, a first advertisement source server 116, and a second advertisement source server 118. Alternatively, the device 102 may access the base transceiver station 108 through a peer device 102 acting as an intermediary, in a relay type or hop type of connection.

The communication server 112 in turn interacts with the content provider server 114 and the advertisement source servers 116-118 through the network 110. The content provider server 114 provides content requested by the device 102, such as web pages. The content provider server 114 acts as a gateway to the advertisement source servers 116-118, which provide information such as advertisements to transmit to the device 102. The advertisement source servers 116-118 interact with the content provider server 114, which communicates with the device 102 through the network 110 and the base transceiver station 108 by a standard wireless telephony protocol, such as code division multiple access (CDMA), global system for mobile communication (GSM), universal mobile telecommunications system (UMTS), and worldwide interoperability for microwave access (WiMAX), a wireless internet connection, or some other means of wireless communication. Although the content provider server 114 and the advertisement source servers 116-118 are depicted separately in FIG. 1, the functions of the content provider server 114 and the functions of the advertisement source servers 116-118 can be combined on one server.

The communication server 112 may store information related to device communications, selections of advertisement sources, selections of advertisements, and requested content in a data store 120. The display 104 for the device 102 may display a content page 122 provided by the content provider server 114. The content page 122 may include a first advertisement spot 124 that may be filled with an advertisement provided by the first advertisement source server 116 and a second advertisement spot 126 that may be filled with another advertisement provided by the second advertisement source server 118. An advertising spot is a location in a content page where an advertisement may be inserted. If no advertisement is inserted in an advertising spot, the advertising spot may appear blank to a device user.

Figure 2:
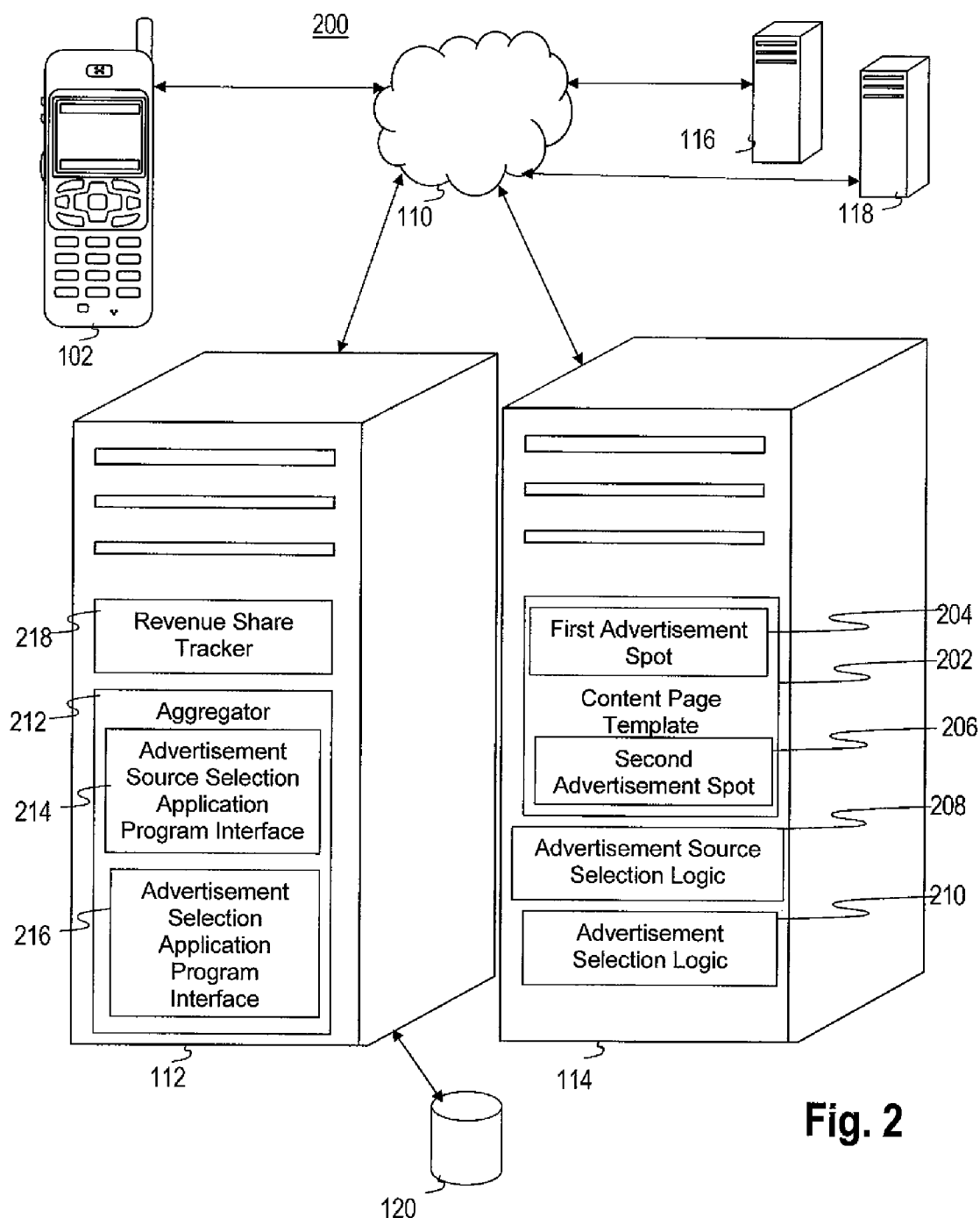
FIG. 2 is another illustration of a wireless communications system for intelligent advertisement selection from multiple sources according to some embodiments of the present disclosure.

FIG. 2 is another illustration of a wireless communications system 200 for intelligent advertisement selection from multiple sources according to some embodiments of the present disclosure. FIG. 2 depicts the device 102, the communication server 112 and the data store 120, the content provider server 114, the first advertisement source server 116, and the second advertisement source server 118 communicating via the network 110. The content provider server 114 includes a content page template 202, which includes a first advertisement spot 204 and a second advertisement spot 206. In response to a request from the device 102 for content, the content provider server 114 generates a content page based on the content page template 202. When the device 102 displays the content page generated from the content page template 202, the advertising spots 204 and 206 may be filled by advertisements provided by the advertisement source servers 116 and 118.

The content provider server 114 may optionally include advertisement source selection logic 208 and advertisement selection logic 210. The communication server 112 may optionally include an aggregator 212, which includes an advertisement source selection application program interface 214 and an advertisement selection application program interface 216. The advertisement source selection logic 208 and the advertisement source application program interface 214 are advertisement source selection components. The advertisement selection logic 210 and the advertisement selection application program interface 216 are advertisement selection components. In response to a request from the device 102 for content, the system 200 may use an advertisement source selection component to select an advertisement source from the advertisement source servers 116 and 118 and use an advertisement selection component to select an advertisement from the selected advertisement source. By executing the aggregator 212, the communication server 112 both executes the advertisement source selection application program interface 214 to select an advertisement source and executes the advertisement selection application program interface 216 to select an advertisement from the selected advertisement source. The communication server 112 may include a revenue share tracker 218 to collect and record information related to requested content and related to these selections of advertisement source and advertisements in the data store 120. Information recorded by the revenue share tracker 218 may be used for determining the frequency of selecting various advertisement sources in the future.

Figure 3:
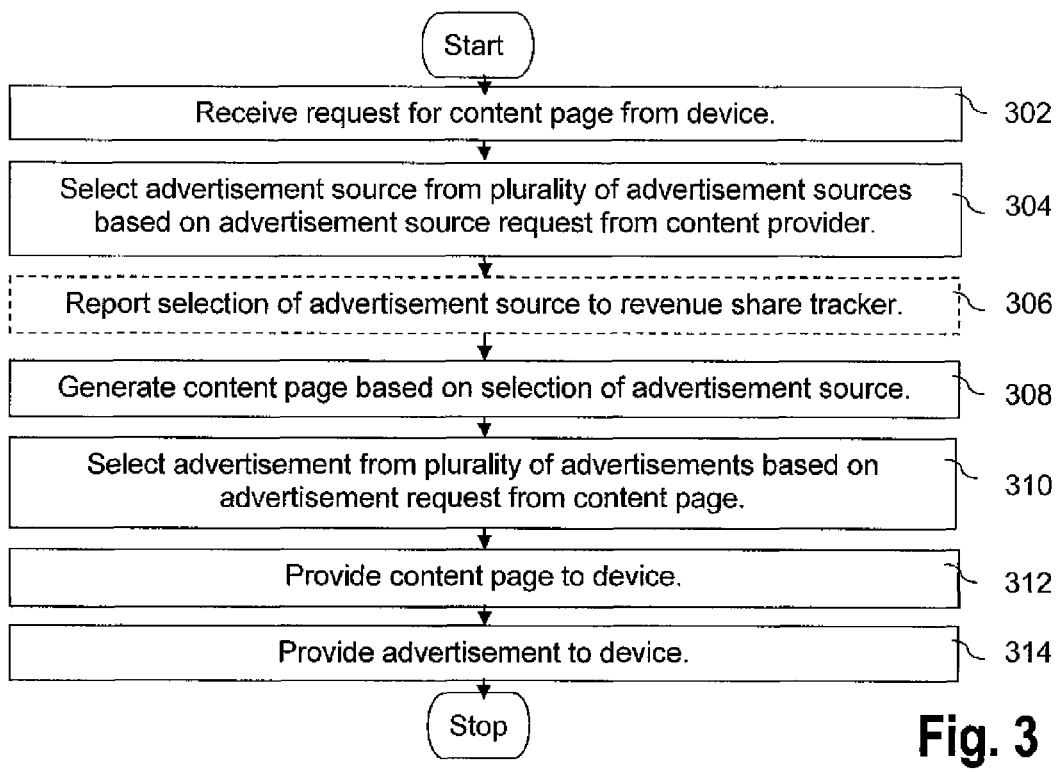
FIG. 3 is a flowchart of a method for intelligent advertisement selection from multiple sources according to some embodiments of the present disclosure.

FIG. 3 is a flowchart illustrating a method for intelligent advertisement selection from multiple sources according to some embodiments of the present disclosure. The method may be used to select an advertisement source, generate a content page that references the selected advertisement source, select an advertisement from the selected advertisement source, and provide the content page with the advertisement to a requesting device 102.

In box 302, a request for a content page is received from a device. For example, the content provider server 114 receives a request for a football scores content page from the device 102.

In box 304, an advertisement source is selected from a plurality of advertisement sources based on an advertisement source request from a content provider. For example, the content provider server 114 executes the advertisement source selection logic 208 to select the second advertisement source server 118 from the advertisement source servers 116 and 118. If the advertisement source request is for a specified advertisement source, the advertisement source selection logic 208 may intercept the request, select the advertisement source, and specify the selected advertisement source.

The advertisement source selection logic 208 may select the first advertisement source server 116 for a front content page of football scores and select the second advertisement source server 118 for a back content page of baseball scores. The advertisement source selection logic 208 may select the first advertisement source server 116 for the top advertising spot, such as the first advertising spot 124, and select the second advertisement source server 118 for a bottom advertising spot, such as the second advertising spot 126. The advertisement source selection logic 208 may select the first advertisement source server 116 based on a first percentage of selections, such as 80% of all content requests, and select the second advertisement source server 118 based on a second percentage of selections, such as the remaining 20% of all content requests. The advertisement source selection logic 208 may select the first advertisement source server 116, and substitute the second advertisement source server 118 if the first advertisement source server 116 does not have an available advertisement. The substitution may result in delayed responses to content requests due to the time spent in determining that the first advertisement source server 116 does not have an available advertisement.

The advertisement source selection logic 208 may select between the first advertisement source server 116 and the second advertisement source server 118 based on an equivalent quality or value of content pages for the first advertisement source server 116 and the second advertisement source server 118. For example, if the advertisement source selection logic 208 is programmed to select the second advertisement source server 118 for 20% of all content requests without basing selections on equivalent quality of content pages, the advertisement source selection logic 208 may be expected to randomly select the second advertisement source server 118 for 20% of all requests for football scores and 20% of all requests for baseball scores. However, the second advertisement source server 118 may be randomly selected for 5% of all requests for football scores and 40% of all requests for baseball scores, such that the quality of content pages may differ for the first advertisement source server 116 and the second advertisement source server 118. The quality or value of the content pages may differ based on different response rates to advertising between device users who request football scores and device users who request baseball scores. The quality or value of the content pages may also differ based on the time of the year when a request is made, such as when baseball teams are competing for championships while football teams are playing relatively meaningless pre-season games.

In box 306, the selection of the advertisement source is optionally reported to a revenue share tracker. For example, the advertisement source selection logic 208 reports the selection of the second advertisement source server 118 to the revenue share tracker 218. The revenue share tracker 218 may record information associated with the selection of the second advertisement source server 118, the requested football scores content page, and the subsequent selection of an advertisement. If the advertisement source selection logic 208 is provided to the content provider server 114 by the content provider instead of by the communication service provider, the advertisement source selection logic 208 may not report the selection of the second advertisement source server 118 to the revenue share tracker 218. The content provider may not have a contractual arrangement or an incentive to report the selection of advertisement source servers to the revenue share tracker. Therefore, the content provider may not provide the additional logic in the advertisement source selection logic 208 to report the selection of advertisement source servers to the revenue share tracker. However, if the communication service provider provides the advertisement source selection logic 208 to the content provider server 114, the advertisement source selection logic 208 may report the selection of the second advertisement source server 118 to the revenue share tracker 218, because the revenue share tracker 218 is also provided by the communication service provider.

In box 308, the content page is generated, referencing the selection of the advertisement source. For example, the content provider 114 generates the football scores content page referencing the selection of the second advertisement source server 118. The content page template 202 for the football scores content page may include code to request the advertisement from either the first advertisement source server 116 or the second advertisement source server 118. In response to the advertisement source selection logic 208 selecting the second advertisement source server 118, the content provider server 114 generates the football scores content page to select advertisements from the second advertisement source server 118.

In box 310, an advertisement is selected from a plurality of advertisements based on an advertisement request from the content page. For example, code in the generated football scores content page requests the content provider server 114 to execute the advertisement selection logic 210 to select a sports-oriented advertisement from the selected second advertisement source server 118.

In box 312, the content page is provided to the device. For example, the content provider server 114 provides the football scores content page to the device 102.

In box 314, the advertisement is provided to the device. For example, the first advertisement source server 116 provides the sports-oriented advertisement for the football scores content page to the device 102.

In one example, the second advertisement source server 118 may provide a uniform resource locater for a selected advertisement to the content provider server 114, and then the content provider server 114 transmits the content requested by the device 102 along with the uniform resource locater for the selected advertisement to the device 102. In this example, after the device 102 receives the content requested by the device 102 along with the uniform resource locater for the selected advertisement, the device 102 uses the uniform resource locater for the selected advertisement to request the selected advertisement from the second advertisement source server 118, and then the second advertisement source server 118 transmits the selected advertisement to the device 102.

In another example, the second advertisement source server 118 provides the selected advertisement to the content provider server 114, and then the content provider server 114 transmits the content requested by the device 102 along with the selected advertisement to the device 102. In this example, the second advertisement source server 118 indirectly transmits the selected advertisement to the device 102 by providing the selected advertisement to the content provider server 114, whereby the content provider server 114 transmits the content requested by the device 102 along with the selected advertisement to the device 102.

In yet another example, the second advertisement source server 118 provides the selected advertisement to the communication server 112, and the content provider server 114 transmits the content requested by the device 102 to the communication server 112. The communication server 112 provides the content requested along with the selected advertisement to the device 102. In this example, the second advertisement source server 118 indirectly transmits the selected advertisement to the device 102 by providing the selected advertisement to the communication server 112, whereby the communication server 112 transmits the content requested by the device 102 along with the selected advertisement to the device 102.

Figure 4:
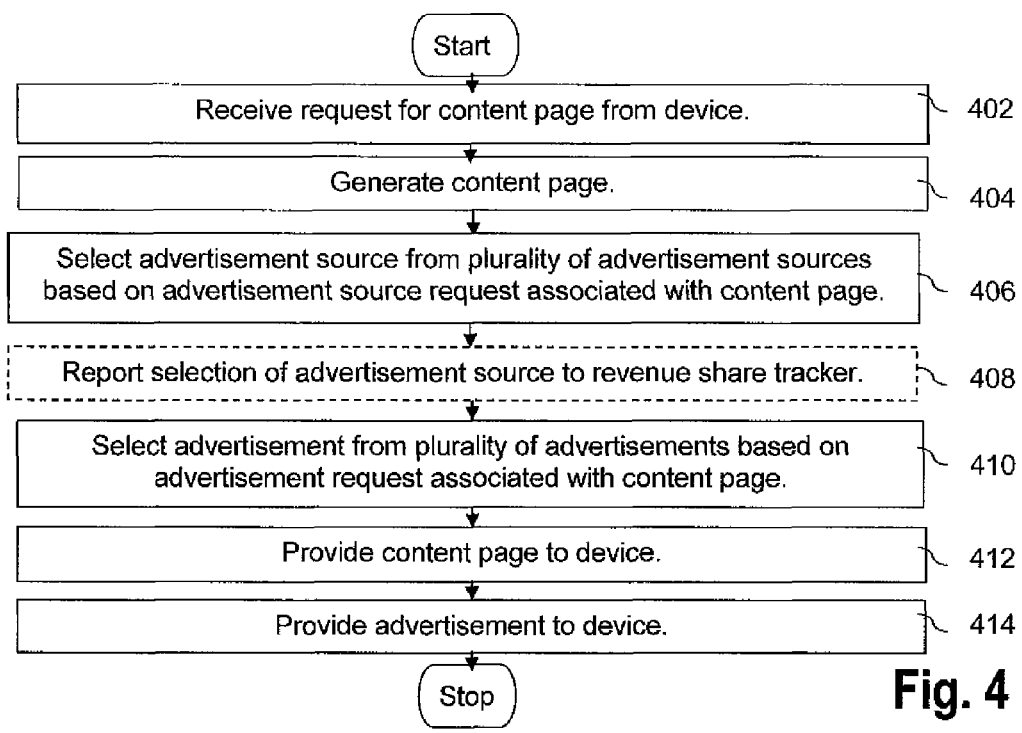
FIG. 4 is a flowchart of another method for intelligent advertisement selection from multiple sources according to some embodiments of the present disclosure.

FIG. 4 is a flowchart illustrating another method for intelligent advertisement selection from multiple sources according to some embodiments of the present disclosure. The method may be used to generate a content page, to select both an advertisement source and an advertisement from the advertisement source, and to provide the requested content page with the advertisement to a requesting device 102.

In box 402, a request for a content page is received from a device. For example, the content provider server 114 receives a request for a news story content page from the device 102.

In box 404, the content page is generated. For example, the content provider server 114 generates the news story content page. The news story content page may include code to select either the first advertisement source server 116 or the second advertisement source server 118 and may include code to request the advertisement from either the first advertisement source server 116 or the second advertisement source server 118.

In box 406, an advertisement source is selected from a plurality of advertisement sources based on an advertisement source request associated with the content page. For example, code in the generated news story content page selects an advertisement source server from the advertisement source servers 116 and 118. In another example, code in the generated news story content page requests the communication server 112 to execute the advertisement source selection application program interface 214 to select an advertisement source server from the advertisement source servers 116 and 118.

In box 408, the selection of the advertisement source is optionally reported to a revenue share tracker. For example, the code in the generated news story content page reports the selection of the second advertisement source server 118 to the revenue share tracker 218. The revenue share tracker 218 may record information associated with the selection of the second advertisement source server 118, the requested news story content page, and the subsequent selection of an advertisement. In another example, the advertisement source selection application program interface 214, which is executed by the communication server 112, reports the selection of the second advertisement source server 118 to the revenue share tracker 218.

In box 410, an advertisement is selected from a plurality of advertisements based on an advertisement request associated with the content page. For example, code in the generated news story content page selects a news-oriented advertisement from the selected second advertisement source server 118.

In box 412, the content page is provided to the device. For example, the content provider server 114 provides the news story content page to the device 102.

In box 414, the advertisement is provided to the device. For example, the first advertisement server 116 provides the news-oriented advertisement for the news story content page to the device 102.

Figure 5:
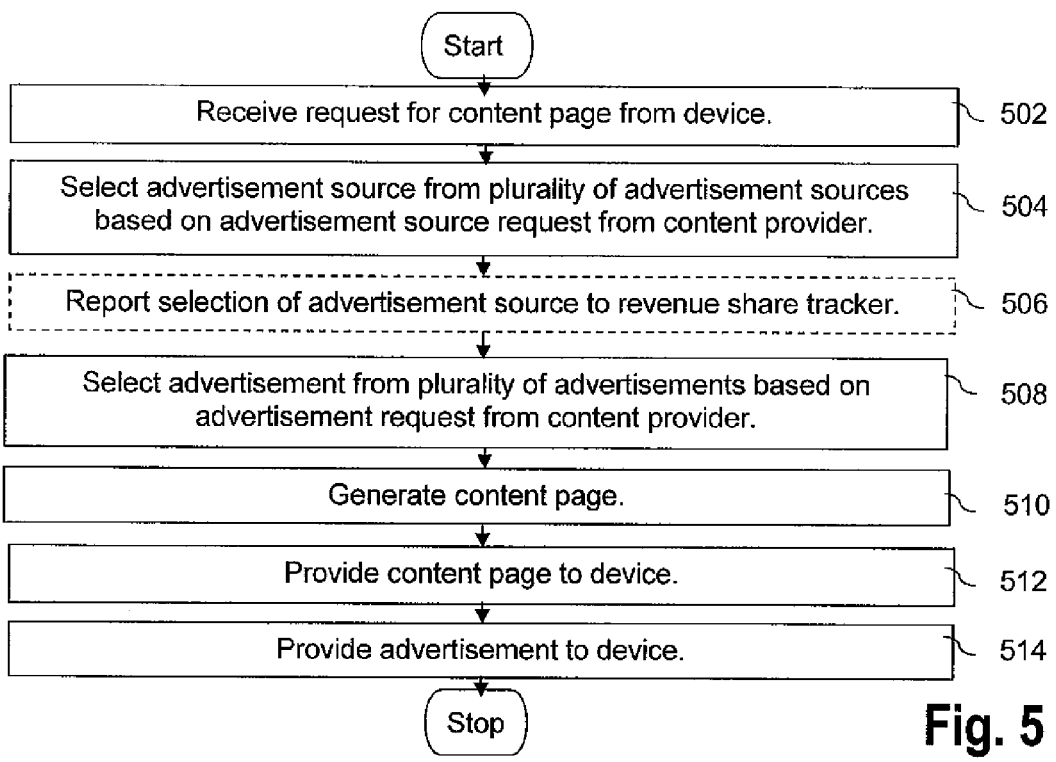
FIG. 5 is a flowchart of yet another method for intelligent advertisement selection from multiple sources according to some embodiments of the present disclosure.

FIG. 5 is a flowchart illustrating yet another method for intelligent advertisement selection from multiple sources according to some embodiments of the present disclosure. The method may be used to select both an advertisement source and an advertisement from the advertisement source, to generate a content page referencing the selections, and to provide the requested content page with the advertisement to a requesting device 102.

In box 502, a request for a content page is received from a device. For example, the content provider server 114 receives a request for a driving directions content page from a device 102.

In box 504, an advertisement source is selected from a plurality of advertisement sources based on an advertisement source request from a content provider. For example, the content provider server 114 executes the advertisement source selection logic 208 to select the second advertisement source server 118 from the advertisement source servers 116 and 118. If the advertisement source request is for a specified advertisement source, the advertising provider selection logic 208 may intercept the request, select the advertisement source, and specify the selected advertisement source.

In box 506, the selection of the advertisement source is optionally reported to a revenue share tracker. For example, the advertising provider selection logic 208 reports the selection of the second advertisement source server 118 to the revenue share tracker 218. If the advertisement source selection logic 208 is provided to the content provider server 114 by the content provider instead of by the communication service provider, the advertising provider selection logic 208 may not report the selection of the second advertisement source server 118 to the revenue share tracker 218.

In box 508, an advertisement is selected from a plurality of advertisements based on an advertisement request from the content provider. For example, in response to the request for the driving directions content page, the content provider server 114 executes the advertisement selection logic 210 to select a driver-oriented advertisement from the selected second advertisement source server 118.

In box 510, the content page is generated. For example, the content provider server 114 generates the driving directions content page. The generated content page references the selection of the advertisement source and the selection of the advertisement. For example, the content page template 202 for the driving directions content page includes code where the selected advertisement source may be specified and code where the selected advertisement may be specified.

In box 512, the content page is provided to the device. For example, the content provider server 114 provides the driving directions content page to the device 102.

In box 514, the advertisement is provided to the device. For example, the second advertisement source server 118 provides the driver-oriented advertisement to the device 102.

Figure 6:
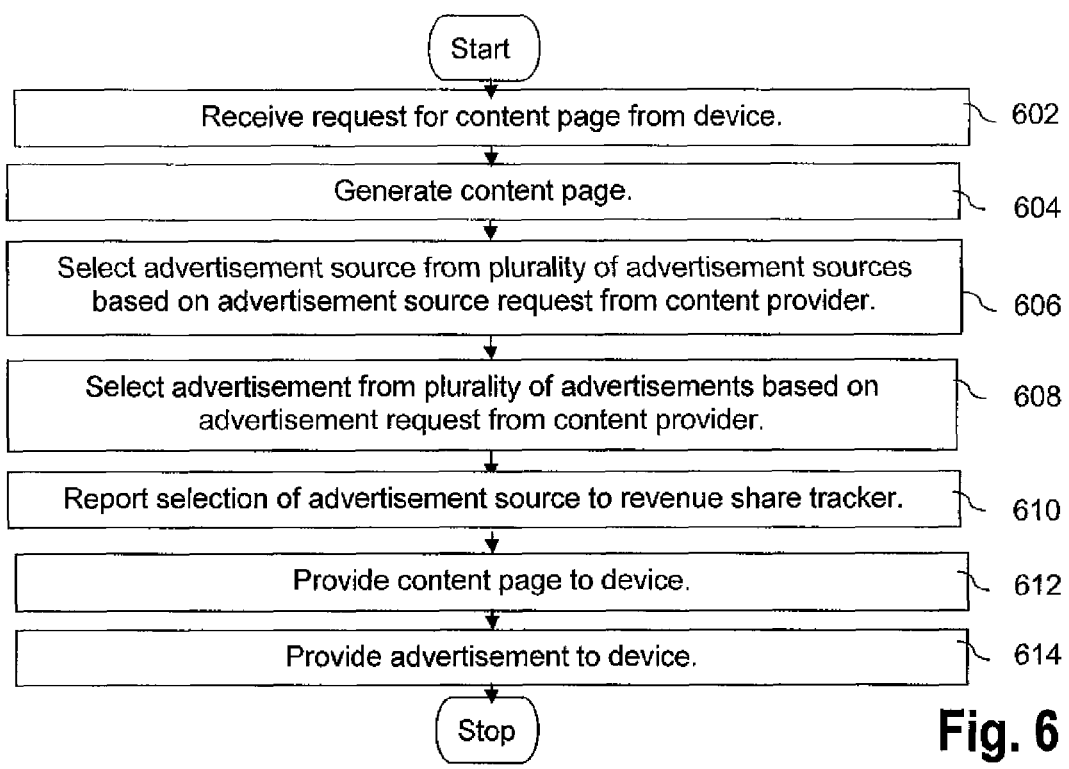
FIG. 6 is a flowchart of an additional method for intelligent advertisement selection from multiple sources according to some embodiments of the present disclosure.

FIG. 6 is a flowchart illustrating an additional method for intelligent advertisement selection from multiple sources according to some embodiments of the present disclosure. The method may be used to generate a content page, to select both an advertisement source and an advertisement from the advertisement source by using application program interfaces, and to provide the requested content page with the advertisement to a requesting device 102.

In box 602, a request for a content page is received from a device. For example, the content provider server 114 receives a request for a movie listings content page from a device 102. In another example, the communication server 112 receives the request for a movie listings content page from the mobile device 102, and forwards the request to the content provider server 114.

In box 604, the content page is generated. For example, the content provider server 114 generates the movie listings content page. Generating the content page is independent from the selection of the advertisement source and the selection of the advertisement. For example, the content page template 202 for the movie listings content page includes code where the advertisement source may be specified later and code where the advertisement may be specified later.

In box 606, an advertisement source is selected from a plurality of advertisement sources based on an advertisement source request from a content provider. For example, the content provider server 114 requests the communication server 112 to execute the aggregator 212, which executes the advertisement source selection application program interface 214 to select the second advertisement source server 118 from the advertisement source servers 116 and 118.

The advertisement source selection application program interface 214 may select the advertisement source from the advertisement source servers 116 and 118 based on a user profile associated with the device 102. For example, the user profile associated with the device 102 that requested the movie listings content page indicates that the device 102 has often requested music downloads. For this example, the advertisement source selection application program interface 214 selects the second advertisement source server 118 because the second advertisement source server 118 offers a music-oriented advertising campaign specifically designed for devices 102 that often request music downloads.

The advertisement source selection application program interface 214 may select the advertisement source from the advertisement source servers 116 and 118 based on information recorded by the revenue share tracker 218. For example, information recorded by the revenue share tracker 218 indicates that the first advertisement source server 116, which is selected 80% of the time, has failed to sell advertising spots on 1% of the occasions when the first advertisement server server 116 is selected. The advertisement source selection application program interface 214 may respond to this failure to sell advertising spots on 1% of the occasions by temporarily reducing the percentage of selections for the first advertisement source server 116 from 80% to 79% and increasing the percentage of selections for the second advertisement source server 118 from 20% to 21%.

In box 608, an advertisement is selected from a plurality of advertisements based on an advertisement request from the content provider. For example, the content provider server 114 requests the communication server 112 to execute the aggregator 212, which executes the advertisement selection application program interface 216 to select a movie-oriented advertisement from the advertisements offered by the second advertisement source server 118. The advertisement selection application program interface 216 may select the advertisement from the advertisement source servers 116 and 118 based on a user profile associated with the device 102. For example, the user profile associated with the device 102 that requested the movie listings content page indicates that the device 102 has often requested music downloads. For this example, the advertisement selection application program interface 216 selects a music-oriented advertisement from the second advertisement source server 118 because the music-oriented advertisement is specifically designed for devices 102 that often request music downloads.

In box 610, the selection of the advertisement source is reported to a revenue share tracker. For example, the advertisement source selection application program interface 214 reports the selection of the second advertisement source server 118 to the revenue share tracker 218. Additionally, the selection of the advertisement may be reported to the revenue share tracker 218. For example, the advertisement selection application program interface 216 reports the selection of the movie-oriented advertisement to the revenue share tracker 218.

In box 612, the content page is provided to the device. For example, the content provider server 114 provides the movie listings content page to the device 102.

In box 614, the advertisement is provided to the device. For example, the second advertisement source server 118 provides the movie-oriented advertisement to the device 102.

In some embodiments, a request for a content page from the device 102 may be received by the content provider server 114 and also possibly by a communication service provider server, such as the communication server 112. The content provider server 114 provides the content page and code associated with the content page. Based on the communication server 112 using the code, an advertisement is obtained from multiple advertisement sources, such as the advertisement source servers 116-118. Either the content provider server 114 or the communication server 112 may select the advertisement source from the advertisement source servers 116-118 based on using the code. The content page and the advertisement may be assembled by the device 102, the content provider server 114, and/or the communication server 112. The content page and the advertisement are provided to the device 102.

Figure 7:
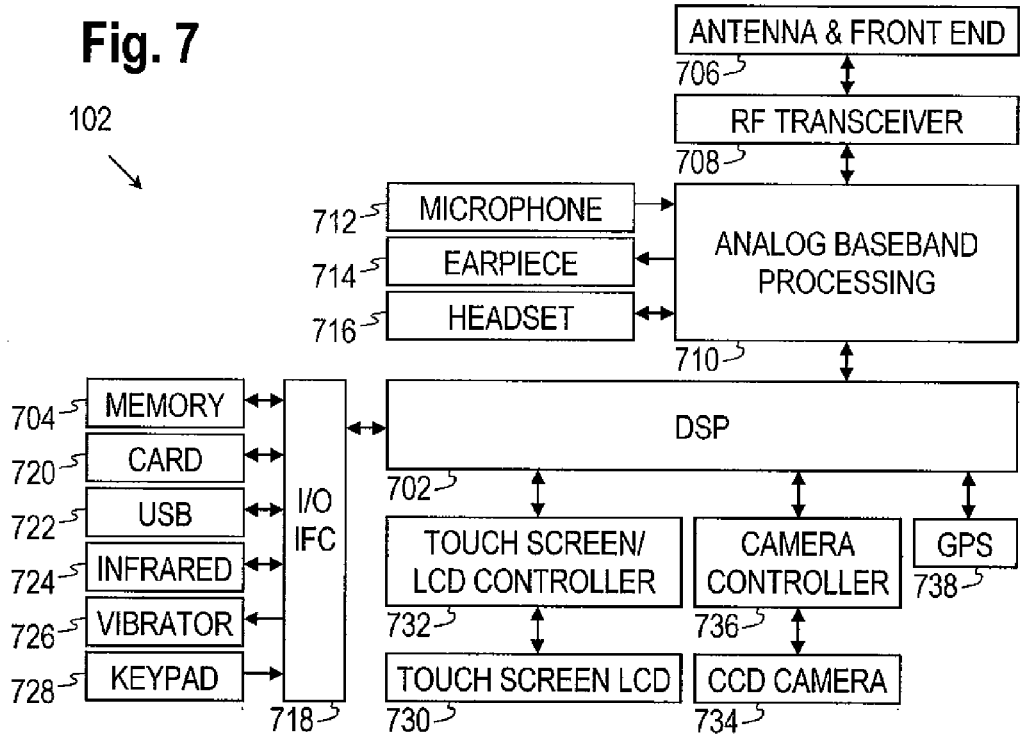
FIG. 7 is a block diagram of an illustrative mobile device according to some embodiments of the present disclosure.

FIG. 7 shows a block diagram of the device 102. While a variety of known components of devices 102 are depicted, in an embodiment a subset of the listed components and/or additional components not listed may be included in the device 102. The device 102 includes a digital signal processor (DSP) 702 and a memory 704. As shown, the device 102 may further include an antenna and front end unit 706, a radio frequency (RF) transceiver 708, an analog baseband processing unit 710, a microphone 712, an earpiece speaker 714, a headset port 716, an input/output interface 718, a removable memory card 720, a universal serial bus (USB) port 722, an infrared port 724, a vibrator 726, a keypad 728, a touch screen liquid crystal display (LCD) with a touch sensitive surface 730, a touch screen/LCD controller 732, a charge-coupled device (CCD) camera 734, a camera controller 736, and a global positioning system (GPS) sensor 738. In an embodiment, the device 102 may include another kind of display that does not provide a touch sensitive screen. In an embodiment, the DSP 702 may communicate directly with the memory 704 without passing through the input/output interface 718.

The DSP 702 or some other form of controller or central processing unit operates to control the various components of the device 102 in accordance with embedded software or firmware stored in memory 704 or stored in memory contained within the DSP 702 itself. In addition to the embedded software or firmware, the DSP 702 may execute other applications stored in the memory 704 or made available via information carrier media such as portable data storage media like the removable memory card 720 or via wired or wireless network communications. The application software may comprise a compiled set of machine-readable instructions that configure the DSP 702 to provide the desired functionality, or the application software may be high-level software instructions to be processed by an interpreter or compiler to indirectly configure the DSP 702.

The antenna and front end unit 706 may be provided to convert between wireless signals and electrical signals, enabling the device 102 to send and receive information from a cellular network or some other available wireless communications network or from a peer device 102. In an embodiment, the antenna and front end unit 706 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 706 may include antenna tuning and/or impedance matching components, RF power amplifiers, and/or low noise amplifiers.

The RF transceiver 708 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 710 and/or the DSP 702 or other central processing unit. In some embodiments, the RF transceiver 708, portions of the antenna and front end 706, and the analog baseband processing unit 710 may be combined in one or more processing units and/or application specific integrated circuits (ASICs).

The analog baseband processing unit 710 may provide various analog processing of inputs and outputs, for example analog processing of inputs from the microphone 712 and the headset port 716 and outputs to the earpiece speaker 714 and the headset port 716. To that end, the analog baseband processing unit 710 may have ports for connecting to the built-in microphone 712 and the earpiece speaker 714 that enable the device 102 to be used as a cell phone. The analog baseband processing unit 710 may further include a port for connecting to a headset or other hands-free microphone and speaker configuration. The analog baseband processing unit 710 may provide digital-to-analog conversion in one signal direction and analog-to-digital conversion in the opposing signal direction. In some embodiments, at least some of the functionality of the analog baseband processing unit 710 may be provided by digital processing components, for example by the DSP 702 or by other central processing units.

The DSP 702 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 702 may perform modulation, coding, interleaving, and spreading, and for a receiver function the DSP 702 may perform despreading, deinterleaving, decoding, and demodulation. In another embodiment, for example in an orthogonal frequency division multiplex access (OFDMA) technology application, for the transmitter function the DSP 702 may perform modulation, coding, interleaving, inverse fast fourier transforming, and cyclic prefix appending, and for a receiver function the DSP 702 may perform cyclic prefix removal, fast fourier transforming, deinterleaving, decoding, and demodulation. In other wireless technology applications, yet other signal processing functions and combinations of signal processing functions may be performed by the DSP 702.

The DSP 702 may communicate with a wireless network via the analog baseband processing unit 710. In some embodiments, the communication may provide Internet connectivity, enabling a user to gain access to content on the Internet and to send and receive e-mail or text messages. The input/output interface 718 interconnects the DSP 702 and various memories and interfaces. The memory 704 and the removable memory card 720 may provide software and data to configure the operation of the DSP 702. Among the interfaces may be the USB port 722 and the infrared port 724. The USB port 722 may enable the device 102 to function as a peripheral device to exchange information with a personal computer or other computer system. The infrared port 724 and other optional ports such as a Bluetooth interface or an IEEE 802.11 compliant wireless interface may enable the device 102 to communicate wirelessly with other nearby devices and/or wireless base stations.

The input/output interface 718 may further connect the DSP 702 to the vibrator 726 that, when triggered, causes the device 102 to vibrate. The vibrator 726 may serve as a mechanism for silently alerting the user to any of various events such as an incoming call, a new text message, and an appointment reminder.

The keypad 728 couples to the DSP 702 via the interface 718 to provide one mechanism for the user to make selections, enter information, and otherwise provide input to the device 102. Another input mechanism may be the touch screen LCD 730, which may also display text and/or graphics to the user. The touch screen LCD controller 732 couples the DSP 702 to the touch screen LCD 730.

The CCD camera 734 enables the device 102 to take digital pictures. The DSP 702 communicates with the CCD camera 734 via the camera controller 736. The GPS sensor 738 is coupled to the DSP 702 to decode global positioning system signals, thereby enabling the device 102 to determine its position. In another embodiment, a camera operating according to a technology other than Charge Coupled Device cameras may be employed. Various other peripherals may also be included to provide additional functions, e.g., radio and television reception.

Figure 8:
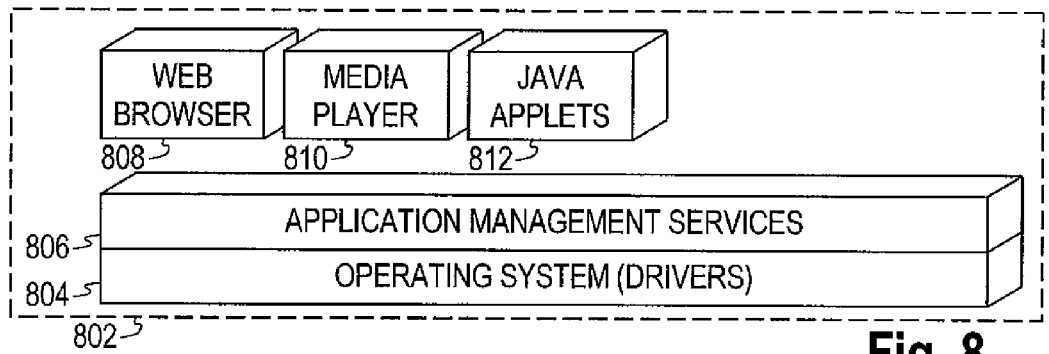
FIG. 8 is a block diagram of an illustrative software configuration for a mobile device according to some embodiments of the present disclosure.

FIG. 8 illustrates a software environment 802 that may be implemented by the DSP 702. The DSP 702 executes operating system drivers 804 that provide a platform from which the rest of the software operates. The operating system drivers 804 provide drivers for the device 102 hardware with standardized interfaces that are accessible to application software. The operating system drivers 804 include application management services ("AMS") 806 that transfer control between applications running on the device 102. Also shown in FIG. 7 are a web browser application 808, a media player application 810, and JAVA applets 812. The web browser application 808 configures the device 102 to operate as a web browser, allowing a user to enter information into forms and select links to retrieve and view web pages. The media player application 810 configures the device 102 to retrieve and play audio or audiovisual media. The JAVA applets 812 configure the device 102 to provide games, utilities, and other functionality.

Figure 9:
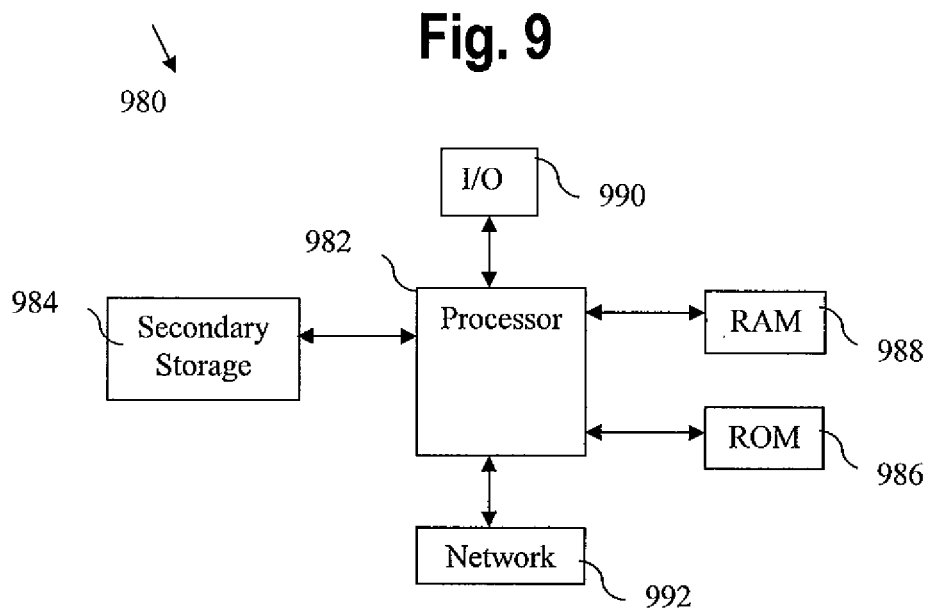
FIG. 9 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 9 illustrates a typical, general-purpose computer system suitable for implementing one or more embodiments disclosed herein. The computer system 980 includes a processor 982 (which may be referred to as a central processor unit or CPU) that is in communication with memory devices including secondary storage 984, read only memory (ROM) 986, random access memory (RAM) 988, input/output (I/O) devices 990, and network connectivity devices 992. The processor may be implemented as one or more CPU chips.

The secondary storage 984 is typically comprised of one or more disk drives or tape drives and is used for non-volatile storage of data and as an over-flow data storage device if RAM 988 is not large enough to hold all working data. Secondary storage 984 may be used to store programs which are loaded into RAM 988 when such programs are selected for execution. The ROM 986 is used to store instructions and perhaps data which are read during program execution. ROM 986 is a non-volatile memory device which typically has a small memory capacity relative to the larger memory capacity of secondary storage. The RAM 988 is used to store volatile data and perhaps to store instructions. Access to both ROM 986 and RAM 988 is typically faster than to secondary storage 984.

I/O devices 990 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 992 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 992 may enable the processor 982 to communicate with an Internet or one or more intranets. With such a network connection, it is contemplated that the processor 982 might receive information from the network, or might output information to the network in the course of performing the above-described method steps. Such information, which is often represented as a sequence of instructions to be executed using processor 982, may be received from and outputted to the network, for example, in the form of a computer data signal embodied in a carrier wave Such information, which may include data or instructions to be executed using processor 982 for example, may be received from and outputted to the network, for example, in the form of a computer data baseband signal or signal embodied in a carrier wave. The baseband signal or signal embodied in the carrier wave generated by the network connectivity devices 992 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 982 executes instructions, codes, computer programs, scripts which it accesses from hard disk, floppy disk, optical disk (these various disk based systems may all be considered secondary storage 984), ROM 986, RAM 988, or the network connectivity devices 992.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A computer implemented method for advertisement selection from multiple sources, comprising:
    receiving, by a content provider server, a request for a content page from a user device;
    selecting, by the content provider server, at least one advertisement source server from a plurality of advertisement source servers from which to select an advertisement to be displayed in an advertisement spot of the content page based on a first criteria;
    generating, by the content provider server, a content page template referencing the selection of the at least one advertisement source server for the advertisement spot of the content page;
    generating, by the content provider server, the content page from the content page template, wherein the advertisement to be displayed in the advertisement spot of the content page is selected from a plurality of advertisements from the selected at least one advertisement source server referenced in the content page template based on a second criteria;
    providing, by the content provider server, the content page to the user device; and
    providing, by the content provider server, the selected advertisement for presentation with the content page to the user device;
    wherein the first criteria for selecting the at least one advertisement source server and the second criteria for selecting the advertisement are different criteria; and
    wherein selecting the at least one advertisement source server comprises:
        selecting a first advertisement source server based on a first percentage of content requests and selecting a second advertisement source server based on a second percentage of content requests and further based on relevance of content pages associated with the content requests.

2. The computer implemented method of claim 1, further comprising reporting, by the content provider server, the selection of the at least one advertisement source server to a revenue share tracker, wherein the revenue share tracker records information associated with the selection of the at least one advertisement source server, the selection of the advertisement, and the content page.

3. The computer implemented method of claim 1, wherein the content page comprises code to request the advertisement from at least one of the first advertisement source server and the second advertisement source server.

4. The computer implemented method of claim 1, wherein selecting the at least one advertisement source server from the plurality of advertisement source servers comprises selecting the first advertisement source server for a front content page and selecting the second advertisement source server for a back content page.

5. The computer implemented method of claim 1, wherein selecting the at least one advertisement source server from the plurality of advertisement source servers comprises selecting the first advertisement source server for a top advertising spot and selecting the second advertisement source server for a bottom advertising spot.

6. The computer implemented method of claim 1, wherein selecting the at least one advertisement source server from the plurality of advertisement source servers is further based on a user profile associated with the user device.

7. The computer implemented method of claim 1, wherein the advertisement to be displayed in the advertisement spot of the content page is selected from the plurality of advertisements based on a user profile associated with the user device.

8. A system for advertisement selection from multiple sources, comprising:
    a first processor;
    a second processor;
    an advertisement source selection component executed by the first processor to select at least one advertisement source server from a plurality of advertisement source servers from which to select an advertisement to be displayed in an advertisement spot of the content page based on a first criteria and to generate a content page template referencing the selection of the at least one advertisement source server for the advertisement spot of the content page; and
    an advertisement selection component executed by the second processor to select an advertisement for display in the advertisement spot of the content page from a plurality of advertisements from the selected at least one advertisement source server referenced in the content page template based on a second criteria in response to an advertisement request associated with the content page, wherein the at least one advertisement source server provides the advertisement for presentation with the content page to a user device, and wherein the first criteria for selecting the at least one advertisement source server and the second criteria for selecting the advertisement are different criteria; and wherein the advertisement source selection component selects the at least one advertisement source server by:
selecting a first advertisement source server based on a first percentage of content requests and selecting a second advertisement source server based on a second percentage of content requests and further based on relevance of content pages associated with the content requests.

9. The system of claim 8, wherein at least one of the advertisement source selection component and the advertisement selection component is executed by at least one of a content provider server and a communication service provider server.

10. The system of claim 8 wherein the user device is one of a mobile computer, a portable computer, a tablet computer, a laptop computer, and a desktop computer.

11. The system of claim 8 wherein the user device has a reduced screen size and is one of a mobile telecommunication device, a mobile handset, a personal digital assistant, a handheld gaming device, a handheld wireless mobile device, a pager, a digital camera, a digital music player, and a digital calculator.

12. The system of claim 8 wherein the advertisement source request and the advertisement request associated with the content page are associated with at least one of a content page that has been generated and a content page that has yet to be generated.

13. A computer implemented method for advertisement selection from multiple sources, comprising:
receiving, by a content provider server, a request for a content page from a user device;
providing, by the content provider server, the content page and code to select at least one advertisement source server and an advertisement associated with an advertisement spot of the content page;
selecting, by the content provider server, the at least one advertisement source server from a plurality of advertisement source servers using the code, wherein the selecting comprises:
selecting a first advertisement source server based on a first percentage of content requests and selecting a second advertisement source server based on a second percentage of content requests and further based on relevance of content pages associated with the content requests;
generating, by the content provider server, a content page template referencing the selection of the at least one advertisement source server for the advertisement spot of the content page;
obtaining, by the content provider server, an advertisement of a plurality of advertisements from the selected at least one advertisement source server referenced in the content page template using the code, wherein the advertisement is obtained based on content of the content page; and
providing, by the content provider server, the content page and the obtained advertisement for presentation to the user device.

14. The computer implemented method of claim 13, further comprising assembling the content page and the advertisement by at least one of the user device, the content provider server, and a communication service provider server.

* * * * *